3,304,239
PROCESS AND AGENT FOR THE ENZYMATIC SPLITTING OF PEPTIDE BONDS
Herbert Zuber, Riehen, Switzerland, assignor to Ciba Corporation, New York, N.Y., a corporation of Delaware
No Drawing. Filed June 11, 1964, Ser. No. 374,250
Claims priority, application Switzerland July 5, 1963, 8,423/63; 8,424/63; Sept. 16, 1963, 11,401/63, 11,402/63; Dec. 24, 1963, 15,941/63, 15,942/63; Jan. 24, 1964, 882/64, 883/64; May 25, 1964, 6,790/64
6 Claims. (Cl. 195—62)

The present invention relates to the use of carboxypeptidase C for splitting peptide bonds in proteins or peptides. The splitting of proteins and peptides is important not only in exploring the structure of these compounds but also in preparing amino acids.

The invention is based on the observation that carboxypeptidase C or extracts and solutions containing it split peptide bonds in a manner different from the hitherto known proteolytic enzymes and that they are particularly suitable for the complete degradation of the amino acid chains of proteins and peptides starting from the carboxyl end. It is known that proteases and peptidases display a more or less considerable specifity. Not only the kind and configuration of the amino acids participating in a peptide bond but also the size of the protein or peptide to be split and the position of the peptide bond in the molecule determine whether a certain enzyme can or cannot split a peptide bond. Among the peptidases capable of splitting the amino acids successively starting from one end of the molecule (exopeptidases) leucinaminopeptidase which acts from the amino end and carboxypeptidases acting from the carboxyl end (A and B and cathepsin) are the best known. Carboxypeptidase A splits off especially easily amino acids having long side chains, for example the aromatic amino acids, or leucine, whereas glycine is liberated only with extreme difficulty. Basic amino acids are not split off, whereas acid ones are split off but very slowly. Carboxypeptidase B eliminates principally lysine and arginine, and cathepsin liberates glycine. Neither carboxypeptidase A nor B splits off proline, consequently, when a protein or peptide contains a proline residue, the degradation ends at that point.

The new carboxypeptidase C is an exopeptidase which, like carboxypeptidases A and B, splits off the amino acids from the carboxyl end. Aromatic and aliphatic, basic and acidic amino acids are split off; proline is likewise eliminated. Glycine is split off slowly. Dipeptides containing a free α-amino group are not hydrolysed. The amino acid at the carboxyl end must be in the L-form. If the penultimate amino acid, counting from the carboxyl end, is a D-amino acid, the elimination of the terminal L-amino acid proceeds but very slowly.

The known carboxypeptidases occur in the animal organism (pancreas, brain). Carboxypeptidase C is the first enzyme found in the vegetable kingdom having a carboxypeptidase function. From the carboxypeptidases A and B it differs both in its action, as indicated above, and also insofar as the pH range of the action is concerned. The optimum pH of carboxypeptidase C is at 5.3, that of carboxypeptidases A and B at 7 to 8. A characteristic difference compared with the carboxy-peptidases A and B is found as regards the hydrolysis inhibitors: Carboxypeptidases A and B are inhibited by ethylenediamine tetraacetic acid disodium salt (EDTA) and orthophenanthroline, carboxy peptidase C is not. Citrate and oxalate ions inhibit carboxypeptidases A and B, but not carboxypeptidase C.

From the catheptic carboxypeptidase carboxypeptidase C differs above all by the kind of its action: Catheptic peptidase eliminates glycine very rapidly, whereas carboxypeptidase C splits glycine off very slowly. At pH 5.3, carboxypeptidase C is inhibited by phenoxyacetic acid, 2,4-dichlorophenoxyacetic acid, phenylacetic acid, indolylacetic acid, and phenylpropionic acid. The inhibition is very low as compared to that of carboxypeptidase A by phenyl propionic acid.

Carboxypeptidase C is not inhibited by diisopropylfluorophosphate (DFP) (or is inhibited only by a high concentration of DFP) but is inhibited by phosphate ions, further substances that inhibit carboxypeptidase C are iron (II) salts (0.05 M).

Carboxypeptidase C displays not only a peptidase activity but also an esterase activity; thus, for example, it eliminates from peptide esters, such as hypertensin II-β-amide monoethyl ester, at first the methyl ester group. However, carboxypeptidase C differs from the acetyl esterase found in citrus fruits: acetyl esterase, whose pH optimum ranges from 5.5 to 7.5, has no peptidase activity; its acetyl esterase activity is inhibited even by a very small amount of DFP ($5.10^{-5}$ mols) whereas the esterase activity of carboxy peptidase C is not affected in the presence of DFP ($2.10^{-4}$ mols of DFP).

The optimum hydrolysis temperature of carboxypeptidase C is 30 to 40° C. At a pH below 4 and above 6 the enzyme is deactivated or denatured. For example, at pH 3 (hydrochloric acid solution), its activity is lost within a few minutes. At pH 7.3, the enzyme is largely deactivated if kept at 30° C. for 20 hours. At the optimum pH value the peptidase is stable for 30 minutes at 50° C.; at 60° C. it is extensively destroyed and at 70° C. completely. Even at room temperature or below it, highly purified and lyophilised carboxypeptidase C is deactivated after several days' storage. The crude lyophilised enzyme (which is mixed with other proteins), on the other hand, has a shelf life of several months. A certain degree of stabilisation of a solution can be achieved by alkali metal ions and ammonium ions, more especially at a concentration of 0.1 to 0.2 mol.

Carboxypeptidase C in the active form can be extracted with water or an aqueous salt solution, more especially a solution of an alkali or alkaline earth metal chloride or ammonium chloride. Instead of the chlorides there may be used other inorganic salts, such as sulfates or nitrates, or salts of organic acids, for example acetates, citrates, oxalates, tartrates or succiniates. The salt solution is advantageously about 0.1-to-1-molar. Carboxy peptidase C in the active form can be precipitated with undenaturing protein precipitants, such as alcohols, for example methanol or ethanol, or acetone at temperatures below 10° C., or with magnesium sulfate or alkali metal sulfates, or more especially with ammonium sulfate, in a concentrated solution of, for example, 70% saturation.

Carboxypeptidase C is isolated from plants, more especially citrus fruits, particularly from their peels, by the methods known for isolating enzymes, taking into consideration the properties of carboxy peptidase C. Thus, disintegrated citrus fruit peels or grated peels of these fruits, can be extracted with an aqueous salt solution, for example a sodium chloride solution, the peptidase then being precipitated with a protein precipitant, preferably ammonium sulfate. The pH value should range from 4.5 to 5.5 and is preferably 5. A preferred temperature is 0° C. For purification the crude product may be dialysed in an aqueous solution and, if desired, subjected to a fractional precipitation with the aforementioned precipitants used in different concentrations.

This pre-purified product can be further purified by being chromatographed once or several times on cross-linked dextranes or on carboxymethyl-cellulose. For the first purification stage dextranes having an ion exchange effect are preferably used, for example, dextranes containing carboxymethyl groups, such as CM-Sephadex, and for the second stage cross-linked dextranes without ion-exchange activity, e.g. Sephadex G–100 or Sephadex G–200. A suitable eluant is, for example, sodium acetate or sodium citrate buffer of pH 5.3. When purification is performed with CM-Sephadex, the enzyme can be eluted with 0.1-molar sodium acetate or sodium citrate buffer. The eluate containing the enzyme may, if desired, be dialysed against an aqueous solution of the aforementioned salts and then lyophilised. The enzyme is obtained in the form of a white, amorphous powder having the properties referred to above. However, in solid form it rapidly loses its activity wherefore it is preferably kept in at least 0.1-molar salt solution. The hydrolytic coefficient $C_1$ of the twice or thrice chromatographed product is about 4 to 6 (measured by the hydrolysis of carbobenzoxy-L-leucyl-L-phenylalanine at 30° C. and a pH of 5.3 at a substrate concentration of $1 \times 10^{-3}$ mol per liter), that is to say, it is in the order of magnitude of the hydrolytic coefficient of carboxypeptidase A $$(C_1 = \frac{k_1}{\text{mg. enzyme nitrogen}} k_1 = \frac{1}{t} \cdot \log \frac{100}{100 - H}$$

where $H$=percent hydrolysis).

The splitting of the proteins or peptides with carboxypeptidase C or extracts or solutions containing it follows the known methods used for the enzymatic splitting of these compounds. The hydrolysis temperature is advantageously 30 to 37° C., and the pH=5.3. The stepwise elimination of the aminoacids as a function of the time can, if desired, be observed qualitatively or quantitatively, for example by way of chromatography and/or electrophoroesis, titration or other analytical methods suitable for determining amino acids.

The following examples illustrate the invention.

Abbreviations used: Z=carbobenzoxy; Ac=acetyl. Abbreviated names of amino acids beginning with a capital letter indicate L-aminoacid residues, those beginning with a lower case letter being D-aminoacid residues.

EXAMPLE 1

A solution of 5 mg. of crude carboxy peptidase (fraction II) in 0.5 ml. of distilled water is adjusted to pH=5 with 0.1 N-sodium hydroxide solution. 1 mg. of peptide (see below) is added and the mixture is kept for 20 hours at 37° C.; a small part of the solution (5–10 μl.) is then withdrawn and subjected to thin-layer chromatography on cellulose in the system n-butanol+acetic acid+water (4:1:5). The spots are stained with ninhydrin. The amino acids identified by their Rƒ values reveal that the peptide was hydrolysed at the positions indicated by arrows:

(1) H-Asp-(NH₂)-Arg-Val-Tyr-Val-His-Pro-Phe-OH
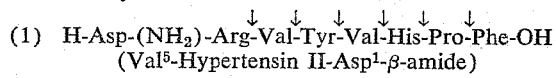
(Val⁵-Hypertensin II-Asp¹-β-amide)

Identified amino acids: L-phenylalanine, L-proline, L-histidine, L-valine, L-tyrosine, and the dipeptide L-asparaginyl-L-arginine.

(2) H-Asp-(NH₂)-Arg-Val-Tyr-Val-His-Pro-Phe-NH₂-
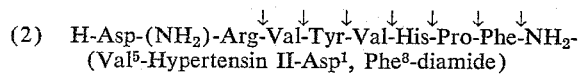
(Val⁵-Hypertensin II-Asp¹, Phe⁸-diamide)

Identified amino acids: As under (1) above. This peptidaminde is split by fraction II only, not by further purified peptidase preparations; fraction II probably contains an amidase that is eliminated during further chromatographic purification.

(3) H-Asp(NH₂)-Arg-Val-Tyr-Val-His-Pro-Phe-OCH₃
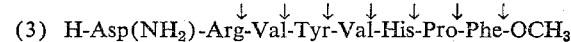

Identified amino acids: As under (1) above.

(4) Ac-Val-Tyr-Pro-OH
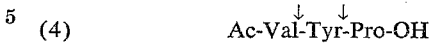

Identified amino acids: L-proline, L-tyrosine.

(5) H-Pro-Leu-Glu-Phe-OH
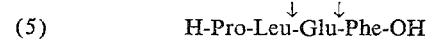

Identified amino acids: L-phenylalanine, L-glutamic acid, and the dipeptide L-prolyl-L-leucine.

(6) Z-Arg-Pro-OH

Identified amino acid: L-proline.

(7) Z-Phe-Pro-OH

Identified amino acid: L-proline.

The crude carboxypeptidase C used as starting material is obtained in the following manner.

From 20 kg. of oranges having as thick a peel as possible the flavedo (outermost yellow peel layer) is obtained by grating on a Bircher grater (4.0 kg.). The grated material is homogenised in a mixer in portions of 200 g. with 250 ml. each of 2.3% sodium chloride solution. The homogenisate is immediately cooled in an ice bath and filtered with the aid of a filter assistant (160 g. of Celite per 200 g. of grated material) by pressing it through a Büchner funnel. The filter cake is discarded and the filtrate (5.3 litres) is cooled to 0° C.

5.3 litres of filtrate are saturated to 70% with ammonium sulfate while being stirred at 0° C. The solution is kept overnight at 0° C. The precipitate is then removed by centrifugation, dissolved in 400 ml. of water and then dialysed for 24 hours at 0° C. against water. The dialysate is discarded and the solution in the dialysis tubing (1.2 liters) is lyophilised, to yield a yellow powder which is dissolved in 2.5 liters of water and subjected to fractional precipitation as follows:

(1) It is saturated to 30% with ammonium sulfate at 0° C. and kept for 6 hours at 0° C.; the precipitate is then removed by centrifugation, dissolved in 300 ml. of water, dialysed against water and lyophilised, to give 1.6 g. of fraction I which is inactive.

(2) The centrifuged solution is saturated to 70% with ammonium sulfate and kept overnight at 0° C. The precipitate is then removed by centrifugation, dissolved in 200 ml. of water, dialysed against water and lyophilised, to give 5.05 g. of fraction II. It is a white powder displaying a proteolytic coefficient $C_1$ of 0.03 (hydrolysis of Z-Leu-Phe OH; substrate concentration 0.001-molar; 30° C.).

The centrifuged ammonium sulfate solution is inactive. The whole peptidase activity is found in fraction II. In the same manner, crude cabroxypeptidase C can be obtained by working up lemon or grapefruit peels.

EXAMPLE 2

5 mg. of crude citrus peptidase (fraction II) are dissolved in water as described in Example 1 and reacted upon 1 mg. of peptide. Portions of 5 to 10 μl of the hydrolysate are separated by a combined electrophoresis-thin-layer-chromatography. To give with, the hydrolysate solution is subjected to a high-voltage electrophoresis (2000 volts, 30 minutes, pH 1.9), with the amino-acids migrating on the thin cellulose layer sprayed with volatile buffer solution. After the buffer solution has been evaporated, chromatography is performed in the system n-butanol+acetic acid+water (4:1:5). The spots are stained with ninhydrin.

The amino acids are identified by the speed of their migration and their Rƒ values.

Hydrolysis occurs at the positions of the peptide indicated by arrows.

(1) H-Arg-Pro-Pro-Ser-Phe-Gly-Phe-Arg-OH

Identified aminoacids: L-arginine, L-phenylalanine, glycine, L-serine.

(2) Z-Arg-Arg-Pro-Val-Lys-Val-Tyr-Pro-OH

Identified aminoacids: L-proline, L-tyrosine, L-valine, L-lysine.

(3) H-Asp-Glu-Gly-Pro-Tyr-Lys-Met-Glu-His-

Phe-Arg-Try-Gly-Ser-Pro-Pro-Lys-Asp-OH  (β-MSH)

Identified amino acids: L-aspartic acid, L-lysine, L-prolene, L-serine, glycine, L-tryptophan, L-arginine, L-phenylalanine, L-histidine, L-glutamic acid, L-methionine, L-tyrosine.

From this octadecapeptide, carboxypeptidase A splits off only half a mol of aspartic acid (and no other amino acids), a large excess of enzyme and a long hydrolysis period being required. (Cf. J. J. Harris and P. Roos, Bioch. J. 71, 434 (1959).

(4) H-Arg-Val-Tyr-Val-His-Pro-phe-OH; no hydrolysis (5) H-Gly-Pro-OH; no hydrolysis (6) H-Pro-Pro-Ser-Phe-Gly-Arg-OH Identified aminoacids; L-arginine, L-phenylalanine, glycine, L-serine.

EXAMPLE 3

200γ of carbobenzoxy-L-lysyl-L-aspartic acid are dissolved in 0.5 ml. of water and 1 mg., and respectively 5 mg., of fraction II are added; the whole is adjusted to pH=5 and kept for 18 hours at 30° C. Thin-layer chromatography on cellulose in the system n-butanol+acetic acid+water (4:1:5) identifies in the hydrolysate 80 to 90% of aspartic acid (with 1 mg. of fraction II) and, respectively, 90 to 100% of aspartic acid (with 5 mg. of fraction II).

Under identical hydrolysis conditions the aforementioned dipeptide derivative is not split by carboxypeptidase A (5γ and 50γ respectively).

EXAMPLE 4

The proteolytic coefficients $C_1$ of fraction II (see Example 1) were determined for the dipeptide derivatives shown in the following table at a substrate concentration of 0.001-mol at 30° C.:

*Table 1*

| Substrate: | $C_1$ |
|---|---|
| Z-Leu-Phe-OH | 0.03 |
| Z-Arg-Pro-OH | 0.0006 |
| Z-Phe-Pro-OH | 0.0003 |
| Z-Gly-Glu-OH | 0.0005 |
| Z-Lys-Asp-OH | 0.001 |
| Z-Val-Lys-OH | 0.0005 |
| Z-Ala-Glu-(NH$_2$)-OH | 0.002 |

EXAMPLE 5

(a) A solution of 500 mg. of fraction II described in Example I in 10 ml. of citrate buffer (pH 5.3; 0.03-molar) is poured over a carboxymethyl-Sephadex column of 2.2 cm. diameter and 20 cm. height (CM-Sephadex C-50, medium; makers Messrs. Pharmacia, Upsala) maintained at 0° C. Fractional elution is performed at a linear buffer gradient: 500 ml. of 0.5-molar sodium citrate buffer (pH 5.3) are continuously run into 500 ml. of 0.03-molar sodium citrate buffer (pH 5.3). The peptidase is contained in fractions 41–52 (citrate buffer 0.1-molar on entering the column). These fractions are combined (25 ml.). The solution is adjusted to pH=5 with dilute sodium hydroxide solution, dialysed at 0° C. for 24 hours against 0.01-molar sodium chloride solution and lyophilised. Yield: 95 mg. of a white powder ($E_2$).

(b) When the 0.5-molar and 0.03-molar sodium citrate buffer solution are replaced by 0.3-molar and 0.03-molar sodium acetate buffer of pH 5.3 respectively, the peptidase turns up in fractions 24 to 28 (buyer is 0.1 molar on entering the column). These fractions are combined (33 ml.), adjusted to pH=5 with dilute sodium hydroxide solution and dialysed for 24 hours at 0° C. against 0.01-molar sodium chloride solution.

Yield: 45 mg. of a white powder ($E_2$); protein content: 10 mg.

Fraction $E_2$ was used for splitting two amino-protected dipeptides (substrate concentration 0.001 mol or temperature 30° C.). The following proteolytic coefficients were found:

| Substrate: | $C_1$ |
|---|---|
| Z-Leu-Phe-OH | 0.3 (1.3 calculated on protein). |
| Z-Arg-Pro-OH | 0.003 (0.013 calculated on protein). |

EXAMPLE 6

500 mg. of fraction II obtained as described in Example 1 are chromatographed as in Example 5(a) but with the use of 0.3-molar and 0.03-molar sodium citrate buffer. The peptidase is contained in fractions 32–43 which are combined, dialysed and lyophilised as described in Example 5(a). Of the dry substance obtained 35 mg. are dissolved in 0.5 ml. of water and once more chromatographed on CM-sephadex C–50 at a linear gradient of 0.3-molar (50 ml.) in 0.03-molar (50 ml.) sodium acetate buffer. The active substance is contained in fractions 18–20 ($E_3$=9.4 ml.). The solution contains 1.5 mg. of protein. The proteolytic coefficient, referred to protein, for the hydrolysis of Z-Leu-Phe-OH (0.001-molar, 30° C.) is $C_1$=6.

EXAMPLE 7

A peptidase fraction II, obtained in the manner described in Example 1 (starting material: 20 kg. of Brazilian oranges. Fraction II=2 g.) is caused to act on various carbobenzoxydipeptides:

Substrate concentration: 1 μmol/ml.; enzyme concentration: 5 mg. Fraction II per 0.5 ml. (N-content=10% =1 mg./ml.); temperature: 30° C.; pH=5.3; period: 60 minutes (except with Z-Leu-Phe-OH where the period was reduced to 10 minutes owing to the high rate of hydrolysis). Table 2 shows the degree of hydrolysis (H) as a percentage of the amino acid split off at the carboxyl end.

*Table 2*

| Substrate: | H |
|---|---|
| Z-Leu-Phen-OH | 76 (10′) |
| Z-Pro-Phe-OH | 40 |
| Z-Gly-Leu-OH | 35 |
| Z-Arg-Pro-OH | 31 |
| Z-Phe-Pro-OH | 20 |
| Z-Ala-Glu (NH$_2$)-OH | 44 |
| Z-Gly-Glu-OH | 30 |
| Z-Lys-Asp-OH | 37 |
| Z-Val-Lys-OH | 30 |
| Z-Val-His-OH | 26 |

EXAMPLE 8

Carboxypeptidase C from varying stages of purification (ammonium sulfate precipitation product Fraction II=$E_1$; product further purified with carboxymethyl-Sephadex-C–50=$E_2$; then product purified once with Sephadex-G-100 ($E_3$), and twice with Sephadex-G-100 ($E_4$) is caused to act on the substrates Z-Leu-Phe-OH and Z-Arg-Pro-OH: substrate concentration 0.001 mol/l.; enzyme concentration see Table 3; pH=5.3; 30° C.; hydrolysis period see Table 3. Table 3 shows the degree of hydrolysis H (in percent of the amino acid split off), the velocity constant of hydrolysis $k_1$, and the proteolytic coefficient $C_1$.

Table 3

| Substrate | Fraction | Enzyme concentration in γ nitrogen/ml. | Period | $C_1$ | $k_1 \times 10^3$ | H |
|---|---|---|---|---|---|---|
| Z-Leu-Phe-OH, 2 mg./5 ml | $E_1$ | 200 | 10' | 0.07 | 14 | 28 |
|  | $E_2$ | 6.6 | 10' | 1.5 | 9.7 | 20 |
|  | $E_3$ | 3.2 | 10' | 2.2 | 7.1 | 15 |
|  | $E_4$ | 1.0 | 10' | 4.6 | 4.6 | 10 |
| Z-Arg-Pro-OH, 1 mg./2.5 ml | $E_1$ | 500 | 60' | 0.0046 | 2.3 | 27 |
|  | $E_2$ | 18 | 60' | 0.09 | 1.6 | 20 |
|  | $E_3$ | 8 | 60' | 0.16 | 1.3 | 16 |
|  | $E_4$ | 2.6 | 60' | 0.32 | 0.8 | 11 |

The hydrolysis of Z-Leu-Phe-OH is a reaction of the first order ($k_1=0.014$; $C_1=0.07$). When for the same reaction scheme the proteolytic coefficient of other substrates is calculated from experimental data given in Table 2 in Example 7, the following $C_1$ values are obtained

|  | $C_1(E_1)$ | $C_1(E_4)$ |
|---|---|---|
| Z-Phe-Pro-OH | 0.0029 | 0.20 |
| Z-Gly-Glu-OH | 0.0045 | 0.31 |
| Z-Lys-Asp-OH | 0.0055 | 0.38 |
| Z-Val-Lys-OH | 0.0045 | 0.31 |

The carboxypeptidase C products used are prepared as follows:

From 18 kg. of (South African) oranges with thick peels 2.8 g. of Fraction II ($E_1$), with a protein content of about 80%, are obtained by the process described in Example 1. The proteolytic coefficient $C_1$ is 0.07 (hydrolysis of Z-Leu-Phe-OH; substrate concentration 0.001-m.; 30° C.).

The 2.8 g. of Fraction II obtained are dissolved in 100 ml. of 0.03-m. sodium acetate buffer of pH 5.3 and at 0° C. the solution is poured on a column of carboxymethyl-Sephadex-C-50, medium, having a diameter of 7 cm. and a height of 13 cm. Elution is performed at a linear gradient from 0.03-m to 0.3-m. of sodium acetate (pH 5.3). The peptidase is present in the fractions 90–120 (sodium acetate 0.09-m.). These fractions ($E_2$) of a total of 600 ml. have a proteolytic coefficient $C_1=1.5$. The solution is dialyzed against 0.1-m. sodium acetate, pH 5.3 at 0° C. for 48 hours, then lyophilized. The residue contains 90 mg. of protein. It is dissolved immediately in 20 ml. of water and dialyzed against 0.1-m. sodium citrate buffer, pH 5.3 at 0° C. for 24 hours. The resulting solution (96 ml.) is lyophilized, the residue dissilved immediately in 5 ml. of water, and the solution dialyzed against 0.1-m. sodium citrate buffer of pH 5.3 at 0° C. for 24 hours. There are thus obtained 20 ml. of a solution which is also lyophilized. The residue is dissolved in 2 ml. of water and the solution poured on a Sephadex-G-100 column having a diameter of 1.3 cm. and a height of 113 cm. The Sephadex has previously been swelled at 0° C. for 24 hours in 1-m. sodium citrate buffer of pH 5.3. The active substance is eluted with 1-m. sodium citrate buffer, pH 5.3 (24 hours at 0° C.). The peptidase is in the fractions 33–44. These fractions ($E_3$) of a total of 16 ml. with a protein content of 32 mg. have a proteolytic coefficient $C_1=2.2$. The solution is dialyzed against 0.1-m. sodium citrate buffer at 0° C. for 24 hours, and the resulting 25 ml. are lyophilized. The residue is taken up in 2.3 ml. of water and the solution poured on a Sephadex G–100 column, pre-treated as above, having a diameter of 1 cm. and a height of 100 cm. Elution is performed with 1-m. sodium citrate buffer, pH 5.3. The peptidase is in the fractions 19–24=4.1 ml.=fraction $E_4$; the protein content is 13 mg.; the proteolytic coefficient $C_1$ is 4.6.

EXAMPLE 9

Peptidase obtained from 20 kg. of Spanish oranges, being of various degrees of purification $E_0$, $E_1$, $E_2$) is caused to act on Z-Leu-Phe-OH and on para-nitrophenyl acetate, and the degree of hydrolysis of the substrate is determined, cf. Table 4. Hydrolysis is performed at pH 5.3 (0.1-m. sodium citrate buffer) and at 30° C.

Table 4

| Substrate | Fraction | Substrate concentration in mol | Enzyme concentration in mg. protein/ml. | Period | Degree of hydrolysis in percent |
|---|---|---|---|---|---|
| Z-Leu-Phe-OH | $E_0$ | 0.001 | 1 | 30' | 2 |
|  | $E_1$ | 0.001 | 1 | 30' | 54 |
|  | $E_2$ | 0.001 | 0.14 | 30' | 40 |
| $CH_3COOC_6H_4-NO_2(p)$ | $E_0$ | 0.002 | 0.02 | 30' | 19 |
|  | $E_1$ | 0.002 | 0.02 | 30' | 45 |
|  | $E_2$ | 0.002 | 0.0028 | 30' | 2.7 |

The fraction $E_0$, $E_1$, and $E_2$ are obtained as follows:
$E_0$ as Fraction I of Example 1: 3 g.; protein content =100%; $E_1$ as fraction II of Example 1: 1 g.; protein content=100%; $E_2$ as fraction $E_2$ of Example 5: total of 650 ml. from stages 200–235.

EXAMPLE 10

For the hydrolysis of Z-Leu-Phe-OH a carboxypeptidase product is used which is obtained as follows: By the process described in Example 1, Fraction II (5.9 g.) is prepared from 20 kgs. of oranges. This product is chromatographed on CM-Sephadex G–50 as described in Example 5. The peptidase is in fractions 75–135, 680 ml. in all. At 0° C. the solution is treated with ammonium sulfate until saturated, left to itself overnight at 0° C., then centrifuged for 30 minutes in a preparative ultracentrifuge at 20,000 r.p.m. The sediment is dissolved in 0.1-m. sodium citrate buffer of pH 5.3 and dialyzed against 0.1-m. sodium citrate buffer (pH 5.3). 14.5 ml. of solution having a protein content of 0.7% are thus obtained.

The degree of hydrolysis of Z-Leu-Phe-OH (0.001 mol of substrate; 0.064 mg. of protein/ml.; pH 5.3; 30° C., 30 min.) is 25%.

The molecular weight of the above crude product was determined by the methods of Wieland et al., Biochem. Ztsch. 337, 303 (1963) and P. Andrews, Nature, 196, 36 (1962). 3 each of carboxypeptidase C crude product and (as standard substances) fibrinogen (molecular weight 330,000), γ-globulin (molecular weight 150,000), hemoglobin (molecular weight 68,000), and ovalbumin (molecular weight 40,000), dissolved in 0.1-m. sodium citrate buffer of pH 5.3 are poured on a column of Sephadex G-200 (diameter 1.7 cm., height 76 cm.). The following volumes in ml. were eluted ($V_e$)

Protein:

| | |
|---|---|
| Fibrinogen | 63 |
| γ-globulin | 75 |
| Carboxypeptidase | 90 |
| Hemoglobin | 110 |
| Ovalbumin | 120 |

The molecular weight of carboxypeptidase C calculated therefrom is about 100,000.

The sedimentation coefficient $S_7$ determined in an analytical ultracentrifuge by means of 0.7 ml. of the above buffer solution in a diaphragm cell at 50,740 r.p.m. at 7° C. centrifuged for 171 minutes; observation angle (75–60°) is 4.54S.

What is claimed is:

1. Carboxypeptidase C-preparation obtained from the peels of citrus fruits said carboxypeptidase C being a carboxypeptidase that stepwise splits off, by enzymatic hydrolysis, L-α-amino acids including L-proline, but very slowly glycine, from the carboxyl end of a peptide chain in an aqueous solution at a pH about 4 to 6 and at a temperature of from about 30–40° C., said splitting proceeding up to the N-terminal amino acid when this amino acid has a protected α-amino group and to the amino acid adjacent to the N-terminal amino acid, when the α-amino group of the peptide chain is not protected, said hydrolysis being inhibited by a member selected from the group consisting of phenoxyacetic acid, 2,4-dichlorophenoxyacetic acid, phenylacetic acid, phenylpropionic acid, indolylacetic acid, phosphate ions and iron (II) ions, but not inhibited by a member selected from the group consisting of ethylenediamine tetraacetic acid disodium salt, ortho-phenathroline, diisopropylfluorophosphate, citrate ions, and oxalate ions.

2. A method for stepwise splitting off of amino acids including L-proline from the carboxylic end of the peptide chain of peptides or proteins which comprises contacting a member selected from the group consisting of a peptide and a protein in an aqueous solution at a pH of about 5.3 and at a temperature about 30–37° C. with an effective amount of carboxypeptidase C as claimed in claim 1.

3. A process for the manufacture of carboxypeptidase C as claimed in claim 1 which comprises extracting the peels of citrus fruits with a dilute aqueous salt solution, precipitating the carboxypeptidase C with an undenaturating protein precipitant, dissolving the precipitated carboxypeptidase C in water, dialyzing the resulting solution separating the purified carboxypeptidase C by chromatography.

4. A process as claimed in claim 3, wherein 70% ammonium sulfate is used as protein precipitant.

5. A process as claimed in claim 3, wherein chromatography is carried out with a member selected from the group consisting of a cross-linked dextrane and carboxymethyl cellulose.

6. A process as claimed in claim 3, wherein chromatography is carried out first with a cross-linked dextrane having ion-exchange activity and then with a cross-linked dextrane without ion-exchange activity.

References Cited by the Examiner

Folk, J. E., et. al., Biochimica et Biophysica Acta, vol 48, pages 139–147 (1961), Elsevier Publishing Co., Amsterdam.

A. LOUIS MONACELL, *Primary Examiner.*

L. M. SHAPIRO, *Assistant Examiner.*